United States Patent
Berning et al.

(10) Patent No.: US 9,234,319 B2
(45) Date of Patent: Jan. 12, 2016

(54) AUTOMOTIVE MILLING MACHINE, AS WELL AS METHOD FOR STEERING AN AUTOMOTIVE MILLING MACHINE

(71) Applicant: Wirtgen GmbH, Windhagen (DE)

(72) Inventors: Christian Berning, Brühl (DE); Andreas Vogt, Asbach (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 13/965,936

(22) Filed: Aug. 13, 2013

(65) Prior Publication Data

US 2014/0054949 A1 Feb. 27, 2014

(30) Foreign Application Priority Data

Aug. 23, 2012 (DE) .......................... 10 2012 215 005

(51) Int. Cl.
*E01C 23/088* (2006.01)
*E01C 23/12* (2006.01)
(Continued)

(52) U.S. Cl.
CPC ............ *E01C 23/088* (2013.01); *B65G 41/002* (2013.01); *E01C 23/127* (2013.01); *E21C 27/24* (2013.01)

(58) Field of Classification Search
CPC .................................................. E01C 23/127
USPC ................. 299/1.5, 1.9, 39.2, 39.4
See application file for complete search history.

(56) References Cited

U.S. PATENT DOCUMENTS 3,608,968 A    9/1971  Burnett
4,376,609 A *  3/1983  Bohman et al. ............... 414/335
(Continued)

FOREIGN PATENT DOCUMENTS

DE          155157      5/1982
DE      19628420 A1    1/1998
(Continued)

OTHER PUBLICATIONS

European Search Report in corresponding European Publication EP 13 18 1254, dated Nov. 4, 2013, 3 pp.
(Continued)

*Primary Examiner* — David Bagnell
*Assistant Examiner* — Michael Goodwin
(74) *Attorney, Agent, or Firm* — Lucian Wayne Beavers; Patterson Intellectual Property Law, PC

(57) ABSTRACT

In an automotive milling machine, with a machine frame with longitudinal axis, with a chassis with wheels or tracked travelling drive units which support the machine frame, with a controller for the travelling, steering and milling operation, with a height-adjustable working drum, with a slewable last or single transport conveyor of specified length arranged in front of or behind the working drum as seen in the direction of travel of the milling machine, where the transport conveyor is, as a minimum, slewable sideways about an essentially vertical first axis under a slewing angle, it is provided for the following features to be achieved: the controller comprises a detection and control system which, as a minimum, detects the steering angle of the steering controller for the chassis or, as a minimum, the steering angle of the steering controller and the distance traveled or the travel speed, and controls the slewing angle of the transport conveyor in accordance with this no less than one parameter.

32 Claims, 3 Drawing Sheets

(51) Int. Cl.
*E21C 27/24* (2006.01)
*B65G 41/00* (2006.01)

(56) References Cited

U.S. PATENT DOCUMENTS

| | | | |
|---|---|---|---|
| 4,863,009 A | | 9/1989 | Winkel et al. |
| 5,575,316 A | | 11/1996 | Pollklas |
| 5,857,274 A | | 1/1999 | Rüdiger et al. |
| 6,247,510 B1 | * | 6/2001 | Diekhans et al. ............ 141/231 |
| 6,366,684 B1 | | 4/2002 | Gerard et al. |
| 6,682,416 B2 | * | 1/2004 | Behnke et al. ............... 460/114 |
| 6,943,824 B2 | * | 9/2005 | Alexia et al. .................... 348/89 |
| 7,831,345 B2 | | 11/2010 | Heino et al. |
| 8,499,537 B2 | | 8/2013 | Correns et al. |
| 8,590,983 B2 | | 11/2013 | Berning et al. |
| 2003/0174207 A1 | | 9/2003 | Alexia et al. |
| 2005/0179309 A1 | * | 8/2005 | Berning et al. ............. 299/39.2 |
| 2005/0207841 A1 | | 9/2005 | Holl et al. |
| 2006/0045621 A1 | | 3/2006 | Potts et al. |
| 2008/0258535 A1 | | 10/2008 | Berning et al. |
| 2009/0044505 A1 | * | 2/2009 | Huster et al. ............... 56/10.2 R |
| 2009/0229233 A1 | | 9/2009 | Pollklass et al. |
| 2009/0267402 A1 | * | 10/2009 | Berning et al. ............. 299/39.4 |
| 2010/0014917 A1 | | 1/2010 | Willis et al. |
| 2010/0296867 A1 | | 11/2010 | Buschmann et al. |
| 2011/0061762 A1 | | 3/2011 | Madsen et al. |
| 2011/0080034 A1 | | 4/2011 | Schönebeck et al. |
| 2011/0123268 A1 | | 5/2011 | Berning et al. |
| 2013/0076101 A1 | | 3/2013 | Simon |
| 2013/0080000 A1 | | 3/2013 | Von der Lippe et al. |

FOREIGN PATENT DOCUMENTS

| | | |
|---|---|---|
| DE | 102005035480 A1 | 2/2007 |
| DE | 202007005756 U1 | 8/2008 |
| DE | 102009041842 A1 | 9/2011 |
| EP | 1574122 B1 | 2/2008 |
| EP | 2100495 A1 | 9/2009 |
| EP | 2301318 B1 | 11/2011 |
| EP | 2452551 A2 | 5/2012 |
| EP | 2573267 A1 | 3/2013 |
| WO | 2009098294 A2 | 8/2009 |

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.

Database Compendex XP-002538699, Engineering Information, Inc., Gove et al. "Optimizing Truck-Loader Matching", Mining Engineering, Oct. 1994, pp. 1179-1185, Soc. for Mining, Metallurgy & Exploration, Inc.

Office Action in U.S. Appl. No. 13/624,586 to Jorn Von der Lippe, dated Mar. 31, 2015, 28 pp.

* cited by examiner

AUTOMOTIVE MILLING MACHINE, AS WELL AS METHOD FOR STEERING AN AUTOMOTIVE MILLING MACHINE

BACKGROUND OF THE INVENTION

1. Field of the Invention

The invention relates to an automotive milling machine, as well as to a method for steering an automotive milling machine.

2. Description of the Prior Art

The automotive milling machine, in particular road milling machine or surface miner, comprises a machine frame with longitudinal axis, a chassis with wheels or tracked travelling drive units supporting the machine frame, as well as a controller for the travelling, steering and milling operation and a height-adjustable working drum. A slewable last or single transport conveyor of specified length is arranged in front of or behind the working drum as seen in the direction of travel of the milling machine, where said transport conveyor is, as a minimum, slewable sideways about an essentially vertical first axis under a slewing angle.

The milling machine comprises a controller for the travelling and milling operation, as well as a working drum for the milling of, for example, a road pavement. A transport conveyor device comprising no less than one transport conveyor is located in front of or behind the working drum as seen in the direction of travel. The last or single transport conveyor of the transport conveyor device as seen in the direction of transport may be slewed sideways, relative to the longitudinal axis of the milling machine, under a specifiable slewing angle to the left or right and may be adjustable in height via a specifiable elevation angle. The transport conveyor device comprises a discharge end at which the milled material is discharged onto the loading surface of a transport vehicle via a flight path in the form of a parabolic trajectory that is attributable to the conveying speed and the elevation angle.

In practical operation of such a milling machine, problems caused by the widely projecting transport conveyor arise when steering the milling machine during operation and when relocating the milling machine to a different position.

With a front-loading milling machine, for example, the milled material is discharged towards the front onto the transport vehicle driving ahead. The operator of the milling machine needs to signal to the vehicle driver of the transport vehicle as to when the transport vehicle is to continue moving forward. This leads to problems because the operator basically needs to concentrate on the milling process and at the same time needs to avoid a collision with the transport vehicle driving ahead.

An additional problem lies in the fact that the operator of the milling machine also needs to deal with loading the loading surface by adjusting the slewing angle, elevation angle and conveying speed of the last or single transport conveyor of the transport conveyor device as seen in the direction of transport and is thus distracted from his actual task, which consists in carrying out the milling process. A correction of the slewing angle may be required, for example, when altering the direction of travel of the milling machine.

In case of a rearward-loading milling machine, problems also arise in coordinating the milling machine with the transport vehicle especially as the transport vehicle needs to drive behind the milling machine in reverse travel. An even higher level of stress results for the operator of the milling machine as he needs to control the milling process in forward travel on the one hand, and needs to monitor loading of the transport vehicle behind the milling machine as seen in the direction of travel, needs to control the slewing angle, elevation angle and/or conveying speed of the transport conveyor device, and needs to communicate the necessary information to the vehicle driver on the other.

When relocating the automotive milling machine to a different position, the operator of the milling machine must make sure that the widely projecting transport conveyor does not collide with any lateral obstacles, such as poles, along a track in particular when cornering narrow bends. The transport conveyor may be longer than the actual milling machine and usually measures approx. 5 m to approx. 8 m in length.

SUMMARY OF THE INVENTION

It is therefore the object of the invention to create an automotive milling machine, as well as a method for steering the milling machine, in which the operator of the road milling machine can drive the milling machine during the milling operation or during repositioning of the milling machine without needing to continuously correct the slewing angle of the transport conveyor when cornering, and can do so independent of the direction of travel of the milling machine and the arrangement of the transport conveyor in front of or behind the milling machine as seen in the direction of travel.

The invention advantageously provides that the controller comprises a detection and control system which, as a minimum, detects the steering angle of the steering controller for the chassis or, as a minimum, the steering angle of the steering controller and the distance traveled or the travel speed, and controls the slewing angle of the transport conveyor in accordance with this no less than one parameter. The steering angle enables determination of the current radius of curvature when cornering, and the current radius of curvature enables determination of any necessary adjustment of the slewing angle.

Such automatic control of the slewing angle enables the operator of the milling machine to concentrate on the milling operation and on travelling along a specified milling track, or to relocate the milling machine to a different position whatsoever respectively, without it being necessary to continuously correct the adjusted slewing angle of the transport conveyor. The milling machine can thus be moved in the direction of travel similar to a vehicle with a towed single-axle trailer. In the milling operation, it can also be achieved in this way that the end of the transport conveyor or the point of discharge is always maintained along the centre line of the trajectory of the milling track traveled or along an equidistant to the centre line or within a track of the automotive milling machine. The operator is relieved in that he is not required to continuously concern himself with adjusting the slewing angle of the transport conveyor in particular when driving in bends.

It is preferably intended for the detection and control system to continuously control the slewing angle of the transport conveyor automatically in such a way that the slewable transport conveyor assumes a slewing angle in each steering situation during forward travel or reverse travel which essentially corresponds to the slewing angle of the longitudinal axis of a slewable fictitious single-axle trailer articulated at the first axis when in forward travel.

As a result, the controller can specify a slewing behaviour for the transport conveyor when cornering, both in forward travel and in reverse travel, which corresponds to that of a fictitious single-axle trailer when in forward travel. The operator can thus also drive the milling machine in reverse mode without the transport conveyor behaving similar to a trailer during reverse travel.

In accordance with a further development, it is intended for the detection and control system to specify a slewing angle for the slewable transport conveyor which essentially corresponds to the slewing angle of the longitudinal axis of a slewable trailer articulated at the first axis when in forward travel, where the position of the centre of rotation about the axis of the fictitious trailer is selectable in longitudinal direction.

When mentally substituting the transport conveyor with a trailer of corresponding length, the position of the centre of rotation of the fictitious trailer, in a trailer with a single axle, is where the wheel axle crosses the longitudinal axis of the trailer. The position of the centre of rotation may be specified by means of the controller in that the distance of the centre of rotation from the first vertical axis is entered into the controller.

The centre of rotation may exhibit a distance from the first axis ranging between one third and the entire length of the slewable transport conveyor or the length to the point of discharge, preferably ranging between 40% and 60% of the entire length. Setting the centre of rotation to a value of approx. 50% of the length L is of advantage when repositioning the milling machine as the lateral swinging-out of the transport conveyor is then minimized.

For the milling operation, a value deviating therefrom could also be used. It is also possible for the operator to alter the position of the centre of rotation while driving or in accordance with the type of cornering (such as, for example, driving in a roundabout or turning off at right angles).

The controller may also compute the slewing angle to be specified from the currently specified steering angle (or a steering angle averaged over a specific travel distance respectively) and the constant geometric conditions in that the currently driven bend radius is computed from the steering angle, and the slewing angle of the transport conveyor (in the form of a secant) relative to the longitudinal axis of the milling machine in the current circular track is computed from the bend radius.

The interrelation between the bend radius r and length L of the transport conveyor follows, for example, from the following relationship:

$L = 2\ r\ \sin(\alpha/2)$, where $\alpha$ is the angle between the radii which are pointed at the ends of length L. The slewing angle is then $\alpha/2$ in relation to the longitudinal axis of the milling machine. It is therefore possible to specify a slewing angle of $\alpha/2$ with a variation range of up to ±30%. Length L may also refer, above and beyond the length of the transport conveyor, to the length of the transport conveyor up to the point of impingement of the milled material on a loading surface of a transport vehicle.

It is preferably intended for the detection and control system to continuously control the slewing angle of the slewable transport conveyor automatically in such a way that the slewable transport conveyor assumes a specified slewing angle in each steering situation during forward travel or reverse travel in which the end of the transport conveyor is essentially guided along the centre line or an equidistant to the centre line of the track previously traveled over or yet to be traveled over.

In one particularly preferred further development, it is intended for the transport conveyor to be slewable, under a specified elevation angle, about a second axis orthogonal to the first axis, in which arrangement the transport conveyor discharges the milled material onto the loading surface of a transport vehicle at a specified conveying speed, and the detection and control system continuously locates the position of the loading surface and/or of the transport conveyor and performs a continuous control of the elevation angle of the transport conveyor and/or a continuous speed control of the conveying speed in order to always maintain a point of impingement on the loading surface within said loading surface or, as a minimum, along the longitudinal median plane of the loading surface or along the centre line of the track previously traveled over or yet to be traveled over.

An automatic discharging procedure is thus realized which ensures automatic coordination of the discharging procedure with the movement of the milling machine and of the transport vehicle even when cornering. In this arrangement, the slewing angle of the transport conveyor device is controlled in accordance with the steering angle of the automotive milling machine.

It is preferably intended for the detection and control system to comprise no less than one detector which directly or indirectly detects the specified steering angle of the steering controller for the chassis, or the steering angle and the distance traveled or travel speed, and to comprise additional detectors which directly or indirectly detect the slewing angle and the elevation angle.

An advantageous embodiment provides for the detection and control system to comprise a distance measurement device which can be used to detect the distance to a transport vehicle following in the conveying direction of the transport conveyor, wherein the detection and control system generates start/stop signals for the transport vehicle which are discernible by, preferably visible to the vehicle driver of the transport vehicle.

In this arrangement, it may be intended for a distance range programmable or importable by means of teach-in to be enterable into the detection and control system, said distance range being shorter than the maximum length of the loading surface of the particular transport vehicle, with the start or stop signal being controllable in accordance with the distance measured when leaving the specified distance range.

Movement control signals for the transport vehicle have been described in principle in DE 10 2009 041 842 A1.

The method according to the invention relates to a method for steering an automotive milling machine, in particular road milling machine or surface miner, along a specified track, said automotive milling machine comprising a controller for the travelling, steering and milling operation. The milling machine with longitudinal axis is supported by a steerable chassis with wheels or tracked travelling drive units, where the milled material removed by a working drum is transported away, in the milling operation, by a transport conveyor arranged in front of or behind the milling machine as seen in the direction of travel of the milling machine. The last or single transport conveyor can be slewed sideways. As a minimum, the steering angle of the steering controller for the chassis, or, as a minimum, the steering angle of the steering controller and the distance traveled or the travel speed are detected, and the slewing angle of the transport conveyor is controlled in accordance with this no less than one parameter.

In this arrangement, the slewing angle of the transport conveyor may be continuously controlled automatically in such a way that the slewable transport conveyor assumes a specified slewing angle in each steering situation during forward travel or reverse travel which essentially corresponds to the slewing angle of the longitudinal axis of a fictitious trailer slewable about the first axis when in forward travel.

It is preferably intended for the slewing angle of the slewable transport conveyor to be continuously controlled automatically in such a way that the specified slewing angle essentially corresponds to the slewing angle of the longitudinal axis of a fictitious trailer slewable about the first axis when in forward travel, where the position of the centre of rotation of the trailer along the longitudinal axis of the transport conveyor can be selected freely in order to compute and adjust a current slewing angle.

Additional advantageous features can be inferred from the description.

BRIEF DESCRIPTION OF THE DRAWINGS

In the following, embodiments of the invention are explained in more detail with reference to the drawings.

The following is shown.

DETAILED DESCRIPTION

The following description relates to automotive milling machines, namely, in particular to road milling machines and also to surface miners.

Figure 1:
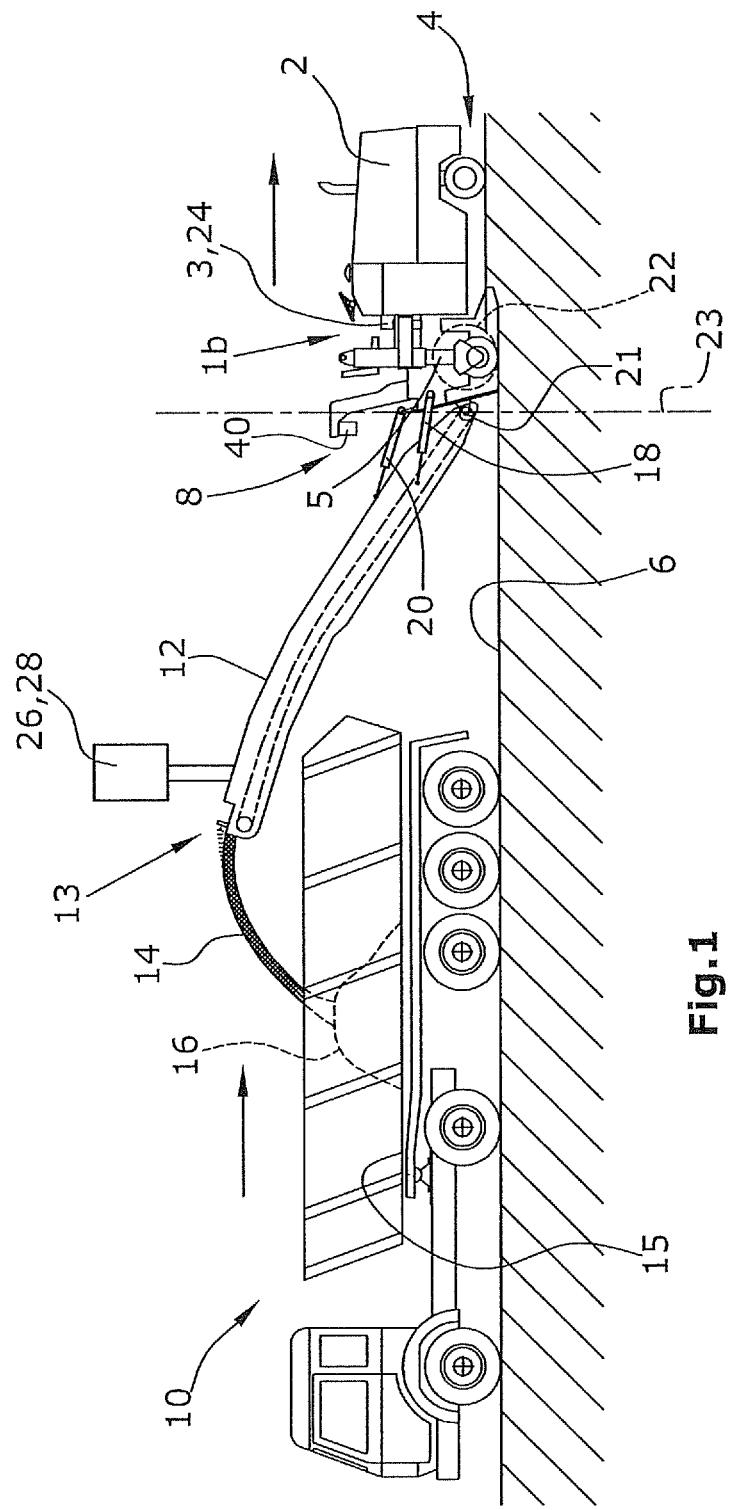
FIG. 1 a rearward-loading road milling machine.

FIG. 1 depicts a rearward-loading milling machine 1b as an example in which the transport vehicle 10 is travelling behind the milling machine in reverse travel mode.

Provided that sufficient space is available on the side next to the milling machine 1a, 1b, the transport vehicle 10 may also be moved next to the milling machine 1 in forward travel.

Figure 2:
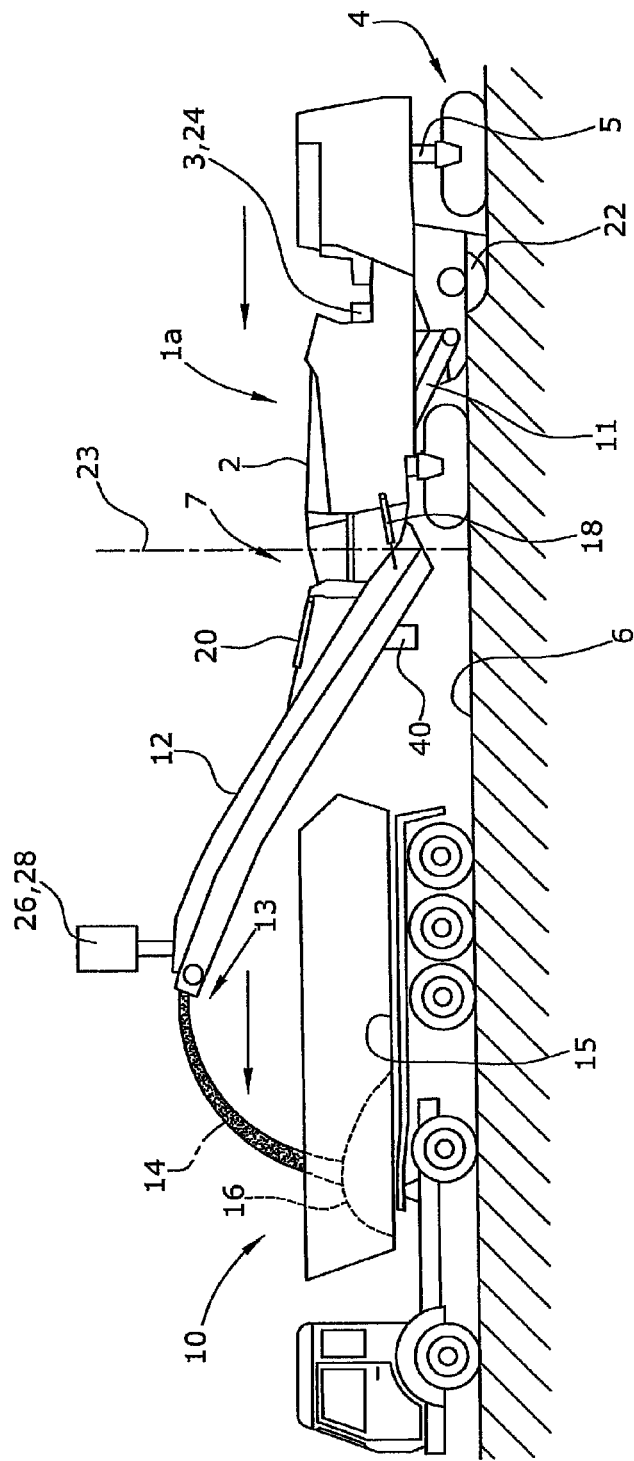
FIG. 2 a front-loading road milling machine.

FIG. 2 shows a milling machine using as an example a front-loading road milling machine 1a. The road construction machine 1 comprises a machine frame 2 which is supported by a chassis 4 comprising, for example, tracked travelling drive units or wheels, said chassis 4 being connected to the machine frame 2 via no less than three height adjustment devices in the form of lifting columns 5. As can be inferred from FIG. 2, four lifting columns 5 are intended for the embodiment which can be used to bring the machine frame 2 into a specifiable plane extending preferably parallel to the road surface 6 which supports the tracked travelling drive units of the chassis 4.

The road milling machine shown in FIG. 2 comprises, in longitudinal direction of the milling machine 1a, a working drum 22 between the tracked travelling drive units of the chassis 4.

The working drum may be adjustable in height via the lifting columns 5 supporting the machine frame 2 or relative to the machine frame 2.

The milling machines 1a,1b may comprise tracked travelling drive units and/or wheels. The tracked travelling drive units and/or wheels may also be referred to as ground engaging units or as running gears.

Other designs of a milling machine 1b may exhibit the working drum 22, for example, at the height of the rear tracked travelling drive units or wheels of the chassis 4, as illustrated in FIG. 1.

The milling machines 1a,1b may comprise a single steerable axle as a steerable axle, or may comprise a steerable front axle in combination with no less than one rear steerable wheeled or tracked travelling drive unit.

A transport conveyor device with no less than one transport conveyor 11,12 for transporting away the milled material may also be arranged at the front end 7 or at the rear end 8 of the milling machine 1a,1b.

The directions of travel of the respective vehicles in FIGS. 1 and 2 are indicated by arrows.

In the embodiment shown in FIG. 2, the milled material milled off by the working drum 22 is discharged onto the loading surface 15 of the transport vehicle 10 via a first permanently installed transport conveyor 11 of the transport conveyor device which transfers the milled material 14 onto a second, slewable transport conveyor 12. As a result of the speed of the transport conveyor 12 of the transport conveyor device, the milled material 14 is not discharged immediately at the end of the transport conveyor 12, but the milled material follows a parabolic trajectory so that the point of impingement 16 on the loading surface 15 is located at a distance from the free end 13 of the transport conveyor 12. The transport conveyor 12 may be slewed from a neutral position to the left or to the right via piston-cylinder units 18 in order to be able to discharge the milled material 14 onto the loading surface 15 even when cornering or in the event of the transport vehicle 10 driving in an offset track, or in order to be able to better manoeuvre the milling machine when relocating it to a different position. In addition, the operator of the milling machine 1a,1b can adjust the elevation angle of the transport conveyor 12 by means of a piston-cylinder unit 20. The elevation angle has an influence on the parabolic trajectory of the milled material 14 and on the position of the point of impingement 16, as has the conveying speed of the transport conveyor 12.

The currently adjusted elevation angle about a horizontal axis 21 or slewing angle about a vertical axis 23 respectively, as well as the current steering angle are reported to a detection and control system 24 that may additionally comprise no less than one detector 26 which continuously detects the position of the loading surface 15 and/or of the last or single transport conveyor 12 of the transport conveyor device as seen in the direction of transport. Said detector 26 may be arranged either at the milling machine 1a, 1b, at the end facing the transport conveyor 12, or at the free end 13 of the transport conveyor 12.

The detection and control system 24 may be integrated into the controller 3 for the travelling, steering and milling operation operated by the machine operator or may, as a minimum, be connected to the same in order to, should the need arise, also obtain data on the travel speed, the distance traveled and/or a detected steering angle of the milling machine 1a,1b and the conveying speed of the transport conveyor 12.

The controller 3 comprises a detection and control system 24 which detects the steering angle of the steering controller for the chassis and controls the slewing angle of the transport conveyor 12 automatically in accordance with this parameter.

Alternatively, the steering angle of the steering controller and the distance traveled may be detected, and the slewing angle of the transport conveyor 12 may be controlled automatically in accordance with these parameters. Additional detection of the distance traveled enables excessive alterations of the slewing angle to be avoided in case of quick alterations of the steering angle. Alternatively, the travel speed may also be detected, and the distance traveled may be computed from the travel speed.

An additional possibility consists in altering the slewing angle in accordance with the steering angle only when a minimum speed has been exceeded.

The slewing angle of the transport conveyor 12 therefore follows the steering angle currently adjusted or adjusted on average over a specific distance traveled, in which arrangement said steering angle may be detected, for example, in that the current steering angle is permanently detected, for example, at the wheels or tracked travelling drive units of the front axle of the chassis or is taken directly from the steering controller.

In this arrangement, the detection and control system 24 may continuously control the slewing angle of the transport conveyor 12 automatically in such a way that in each steering situation during forward travel or reverse travel, the slewable transport conveyor 12 assumes a slewing angle computed and specified by the controller.

As a result, the operator of the milling machine does not need to concern himself with continuously monitoring and, should the need arise, adjusting the slewing angle of the transport conveyor when cornering, be it in the milling operation or when relocating the machine to a different position. Rather, automatic control of the slewing angle reliably achieves for the transport conveyor 12 to essentially behave like a trailing trailer attached to the milling machine when in forward travel. It is assumed in this arrangement that such fictitious trailer is slewable about the first slewing axis 23, and the slewing angle the trailer would assume when cornering in forward travel is used for both forward travel and reverse travel as the adjustable specified slewing angle for the transport conveyor 12.

The fictitious trailer comprises a wheel axle which forms a centre of rotation. For the purpose of the controller 3 or the detection and control system 24 respectively computing the slewing angle, the position of the centre of rotation can be selected freely preferably in the range between one third and the entire length of the slewable transport conveyor 12, or between one third and the entire length up to the point of impingement 16 on a loading surface 15 of the transport vehicle. In a preferred embodiment, the detection and control system 24 may continuously control the slewing angle of the transport conveyor 12 automatically in such a way that the slewable transport conveyor 12 assumes a slewing angle in each steering situation during forward travel or reverse travel in which the end of the transport conveyor 12, or alternatively the point of impingement 16 on the loading surface 15, is essentially guided along the centre line 34 of the track 32 previously traveled over or yet to be traveled over.

In accordance with an additional alternative, the end of the transport conveyor 12 may also be guided along an equidistant to the centre line 34 of the track 32 previously traveled over or yet to be traveled over, namely, in the event that a transport vehicle 10 is moved next to the track 32.

In addition, the detection and control system 24 may comprise a distance measurement device 40 which can be used to detect the distance to a transport vehicle 10 following in the conveying direction of the transport conveyor 12. In this arrangement, the detection and control system 24 may generate discernible, preferably visible start/stop signals for the vehicle driver of the transport vehicle 10.

A distance range programmable or importable by means of teach-in may be enterable into the detection and control system 24, said distance range being shorter than the maximum length of the loading surface 15 of the particular transport vehicle 10. When leaving the specified distance range, the start or stop signal may be indicated in accordance with the distance measured.

Figure 3:
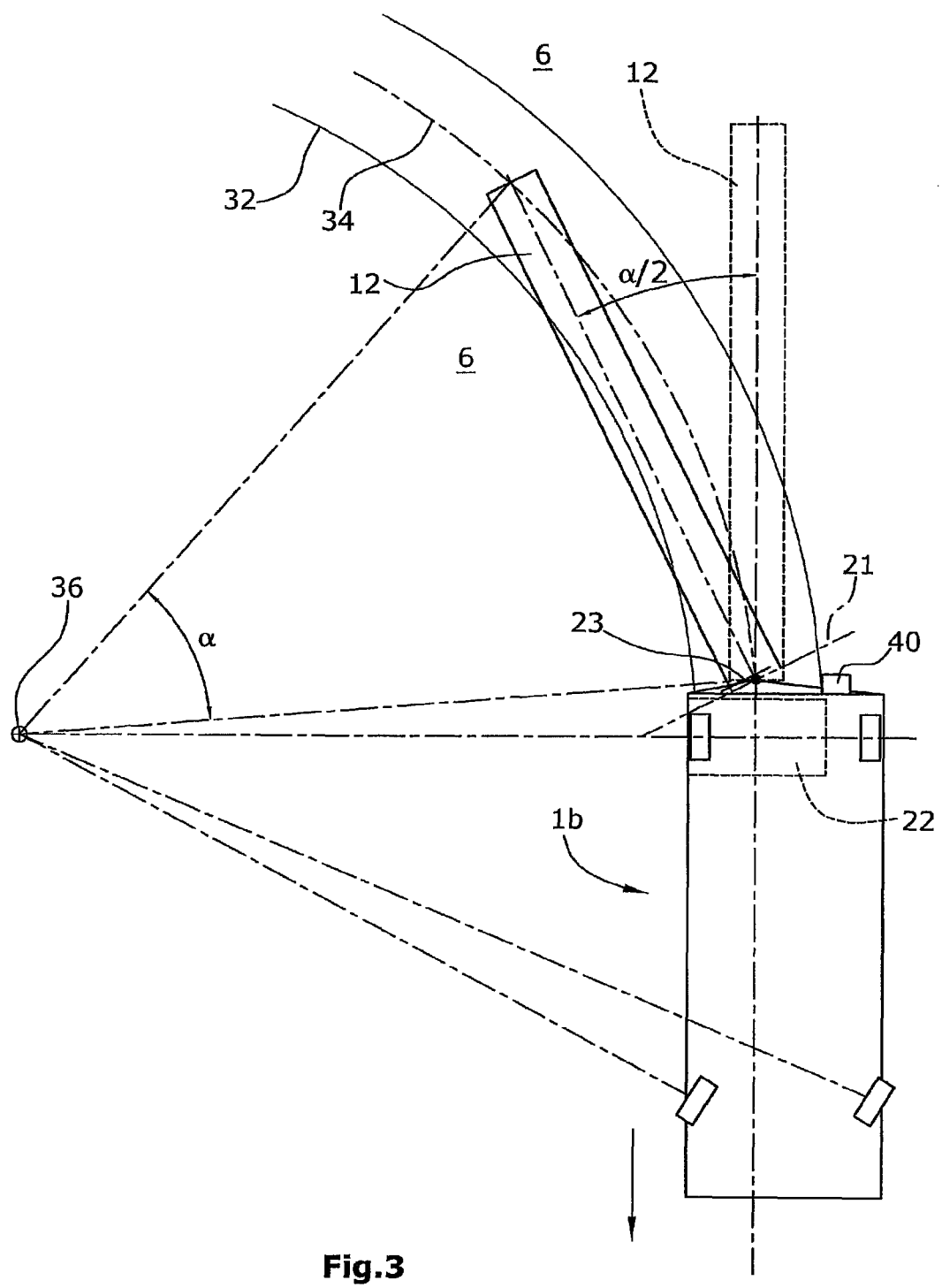
FIG. 3 a schematic illustration of controlling the slewing angle in accordance with the steering angle in a road milling machine according to FIG. 1

FIG. 3 shows a milling machine 1b in accordance with FIG. 1 cornering along a centre line 34 of a track 32. During straight-ahead travel, the transport conveyor 12 assumes the position shown in dashed lines. It is understood that, when a cornering procedure about a centre of rotation 36 is initiated starting from such straight-ahead travel, the transport conveyor 12 would swing out widely if no slewing angle control were performed, and in so doing might, on the one hand, collide with obstacles on the roadside, for example, poles or traffic lights, during repositioning of the milling machine, or, if the slewing angle was not corrected, might not be able to discharge onto a desired point of impingement 16 on the loading surface 15 of a transport vehicle during the milling operation.

The transport conveyor 12 illustrated by a solid line shows the situation where an automatic control of the slewing angle is performed in which the free end of the transport conveyor 12 is guided along the centre line 34. Computation of the slewing angle by the controller 3 may, however, also be effected in such a way that the free end of the transport conveyor 12 may also follow an equidistant to the centre line 34 of the track 32 in order to be able to, for example, load a transport vehicle 10 travelling next to the track 32.

The detection and control system 24 may also locate the alterable position of the loading surface 15 of the transport vehicle 10 and of the last or single transport conveyor 12 of the transport conveyor device as seen in the direction of transport relative to the machine frame 2, and may continuously control positioning of the point of impingement 16 of the milled material 14 automatically via the elevation angle and/or the conveying speed of the transport conveyor device so that the discharged milled material 14 impinges, as a minimum, within the loading surface 15. Alternatively, the alterable position of the loading surface 15 of the transport vehicle 10 may also be continuously located relative to the last or single transport conveyor 12 as seen in the direction of transport in order to perform the control operation.

The detection and control system 24 may detect the position of the loading surface 15 and/or of the last or single transport conveyor 12 as seen in the direction of transport continuously by means of an image-recording system 28 or a non-optical electronic positioning system which supplies data for determining the position of the loading surface 15 in relation to the machine frame 2 or to the last or single transport conveyor 12 as seen in the direction of transport. The information provided by the image-recording system 28 may be evaluated by image-analysing methods known for themselves. One example of a non-optical electronic positioning system is a radio-frequency identification system (RFID) which additionally enables the possibility of identifying a particular loading surface 15 of a particular transport vehicle 10.

When localizing the loading surface 15 by means of RFID, permanently installed RFID tags may be used at the transport vehicle 10 in particular at the loading surface 15.

When localizing with Bluetooth sensor nodes as an additional non-optical localization method, sensor nodes distributed in space are used as markings and the signal field strength, which is dependent on the distance, is measured.

It goes without saying that there is also the possibility to use a combination of different localization methods.

As a general rule, it is possible to use optical and quasi-optical (radio) measurement methods for length and angle, as well as different time measurement processes for time differences and propagation time differences.

The distance measurement may also be realized using the above measurement methods or else with conventional measurement methods, for example, by means of ultrasound.

The target position data may be determined by means of a teach-in procedure in that the positions of the vehicles 1a,1b, 10 are varied in accordance with realistic situations and the parameters required for each such situation, namely elevation angle and conveying speed of the transport conveyor 12, are stored. In the same way, a loading programme may also be created. In doing so, variations in control arising, for example, during cornering may also be taken into account. In the process, the data read in by means of the reading operation may also differentiate as to whether the transport vehicle 10 is driving on the left or on the right next to the milling track 32 or in the milling track 32 of the milling machine 1a, 1b.

What is claimed is:

1. An automotive milling machine, comprising:
   a machine frame with a longitudinal axis;
   a plurality of ground engaging units configured to support the machine frame from a ground surface, at least one of the ground engaging units being steerable in a steering angle;
   working drum connected to the machine frame;
   a transport conveyor slewable sideways in a slewing angle relative to the machine frame about an essentially vertical first axis; and
   a controller including a detection and control system configured to detect at least one parameter and control the slewing angle of the transport conveyor in accordance with the at least one parameter, the at least one parameter including the steering angle; and
   wherein the detection and control system is configured to automatically control the slewing angle of the transport conveyor such that when the machine is steered in a curved path during forward or reverse travel an end of the transport conveyor is guided along a path within a track previously traveled over or to be traveled over by the milling machine.

2. The automotive milling machine of claim 1, wherein the at least one parameter further includes a distance traveled by the milling machine.

3. The automotive milling machine of claim 1, wherein the at least one parameter further includes a travel speed of the milling machine.

4. The automotive milling machine of claim 1, wherein:
   the detection and control system is configured to continuously control the slewing angle of the transport conveyor such that the slewable transport conveyor assumes a slewing angle during forward travel which essentially corresponds to a slewing angle of a longitudinal axis of a slewable fictitious single-axle trailer articulated at the first axis when in forward travel.

5. The automotive milling machine of claim 4, wherein:
   the detection and control system is configured such that a location of the axle of the fictitious single-axle trailer is selectable in longitudinal direction.

6. The automotive milling machine of claim 5, wherein:
   the detection and control system is configured such that the location of the axle of the fictitious single-axle trailer is selectable such that a longitudinal distance of the axle from the first axis is in a range of from one-third to an entire length of the transport conveyor.

7. The automotive milling machine of claim 6, wherein the longitudinal distance of the axle from the first axis is in a range from 40% to 60% of the entire length of the transport conveyor.

8. The automotive milling machine of claim 5, wherein:
   the detection and control system is configured such that the location of the axle of the fictitious single-axle trailer is selectable such that a longitudinal distance of the axle from the first axis is in a range of from one-third to an entire distance from the first axis to a point of impingement of milled material from the transport conveyor onto a loading surface of an associated transport vehicle.

9. The automotive milling machine of claim 8, wherein the longitudinal distance of the axle from the first axis is in a range from 40% to 60% of the entire distance from the first axis to the point of impingement.

10. The automotive milling machine of claim 1, wherein:
    the detection and control system is configured to automatically control the slewing angle of the transport conveyor such that during forward or reverse travel the end of the transport conveyor is essentially guided along a center line, or at a constant spacing from the center line, of the track previously traveled over or to be traveled over by the milling machine.

11. The automotive milling machine of claim 1, wherein:
    the transport conveyor is slewable in an elevation angle about a second axis orthogonal to the first axis;
    the transport conveyor is configured to discharge milled material at a conveying speed onto a point of impingement on a loading surface of a transport vehicle; and
    the detection and control system is configured to determine a position of the loading surface relative to the transport conveyor and to control at least one of the elevation angle and the conveying speed so as to maintain the point of impingement on the loading surface.

12. The automotive milling machine of claim 11, wherein the detection and control system is configured to maintain the point of impingement along a longitudinal median plane of the loading surface.

13. The automotive milling machine of claim 11, wherein the detection and control system is configured to maintain the point of impingement along a center line of the track of the milling machine.

14. The automotive milling machine of claim 11, wherein the detection and control system comprises:
    a steering detector configured to detect the steering angle;
    a slewing detector configured to detect the slewing angle of the transport conveyor; and
    an elevation detector configured to detect the elevation angle of the transport conveyor.

15. The automotive milling machine of claim 1, wherein the detection and control system further comprises:
    a distance detector configured to detect a distance traveled by the milling machine.

16. The automotive milling machine of claim 1, wherein the detection and control system further comprises:
    a speed detector configured to detect a travel speed of the milling machine.

17. The milling machine of claim 1, wherein the detection and control system comprises:
    a distance measuring detector configured to detect a distance from the discharge conveyor to a transport vehicle; and
    wherein the detection and control system is configured to generate start and stop signals for the transport vehicle discernible by a vehicle driver of the transport vehicle.

18. The milling machine of claim 17, wherein:
    the detection and control system is configured such that a specified distance range may be entered into the detection and control system, the distance range being less than a maximum length of a loading surface of the transport vehicle; and
    the detection and control system is configured such that the start and stop signals are generated in accordance with the distance from the discharge conveyor to the transport vehicle and in accordance with the specified distance range.

19. A method of steering an automotive milling machine, the method comprising:
    (a) supporting a steerable chassis of the milling machine with a plurality of ground engaging units, the steerable chassis having a steering angle;
    (b) removing milled material from a ground surface with a working drum of the machine;
    (c) transporting the milled material away from the working drum with a transport conveyor, the transport conveyor being slewable sideways in a slewing angle about a first axis;

(d) detecting with at least one detector at least one parameter, the at least one parameter including the steering angle; and
(e) automatically controlling the slewing angle of the transport conveyor in response to the detected at least one parameter such that an end of the transport conveyor is maintained within a track of the milling machine when the machine is steered in a curved path.

20. The method of claim 19, wherein:
in step (d), the at least one parameter further includes a distance traveled by the milling machine.

21. The method of claim 19, wherein:
in step (d), the at least one parameter further includes a travel speed of the milling machine.

22. The method of claim 19, wherein:
step (e) further comprises automatically controlling the slewing angle such that the slewing angle corresponds to a slewing angle of a longitudinal axis of a fictitious single-axle trailer articulated at the first axis.

23. The method of claim 22, wherein:
step (e) further comprises selecting a longitudinal distance of the axle of the fictitious single-axle trailer from the first axis.

24. The method of claim 19, wherein:
step (e) further comprises automatically controlling the slewing angle such that the end of the transport conveyor is guided along a center line of the track of the milling machine.

25. The method of claim 19, wherein:
step (e) further comprises automatically controlling the slewing angle such that the end of the transport conveyor is maintained at a constant distance from a center line of the track of the milling machine.

26. The method of claim 19, wherein:
in step (c) the discharge conveyor is pivotable in an elevation angle about a second axis orthogonal to the first axis, and the discharge conveyor transports the milled material at a conveying speed; and further comprising:
(f) automatically controlling at least one of the elevation angle and the conveying speed such that the milled material is discharged from the discharge conveyor onto a loading surface of a transport vehicle.

27. The method of claim 26, wherein:
in step (f), the milled material is discharged along a median plane of the loading surface.

28. The method of claim 26, wherein:
in step (f), the milled material is discharged along a center line of the track of the milling machine.

29. The method of claim 26, wherein:
in step (f), at least one of the elevation angle and the conveying speed are controlled such that a point of impingement of the milled material on the loading surface is maintained along a longitudinal median plane of the loading surface when the milling machine is cornering.

30. The method of claim 26, wherein:
in step (f), at least one of the elevation angle and the conveying speed are controlled such that a point of impingement of the milled material on the loading surface is maintained along a center line of the track of the milling machine when the milling machine is cornering.

31. The method of claim 19, further comprising:
detecting a distance from the milling machine to a transport vehicle; and
generating start and stop signals discernible by a vehicle driver of the transport vehicle, in response to the detected distance.

32. The method of claim 31, further comprising:
entering a distance range into a controller of the milling machine, the distance range being shorter than a maximum length of a loading surface of the transport vehicle; and
wherein the generated start and stop signals are controlled in response to the detected distance in relation to the distance range.

* * * * *